United States Patent [19]

Neeff

[11] 3,980,427

[45] Sept. 14, 1976

[54] EXHAUST PROCESS FOR THE DYEING OF SYNTHETIC FIBER MATERIALS

[75] Inventor: Rütger Neeff, Leverkusen, Germany

[73] Assignee: Bayer Aktiengesellschaft, Leverkusen, Germany

[22] Filed: Feb. 14, 1975

[21] Appl. No.: 549,852

Related U.S. Application Data

[60] Division of Ser. No. 416,867, Nov. 19, 1973, which is a continuation of Ser. No. 161,282, July 9, 1971, abandoned.

[30] Foreign Application Priority Data

July 10, 1970 Germany............................ 2034264
May 18, 1971 Germany............................ 2124495
May 18, 1971 Germany............................ 2124496

[52] U.S. Cl. ................................. 8/41 R; 8/39 R; 8/174
[51] Int. Cl.² ..................... C09B 27/00; D06P 1/02
[58] Field of Search ........................... 8/39 R, 41 R

[56] References Cited
UNITED STATES PATENTS

| | | | |
|---|---|---|---|
| 3,524,718 | 8/1970 | Nador et al............................ | 8/170 |
| 3,623,834 | 11/1971 | Seuret et al............................ | 8/172 |
| 3,792,971 | 2/1974 | Neeff......................................... | 8/39 |
| 3,891,388 | 6/1975 | Neeff......................................... | 8/39 |

FOREIGN PATENTS OR APPLICATIONS

| | | |
|---|---|---|
| 832,343 | 1/1970 | Canada |
| 1,581,325 | 9/1969 | France |
| 1,952,535 | 4/1971 | Germany |
| 1,153,221 | 5/1969 | United Kingdom |
| 1,192,984 | 5/1970 | United Kingdom |
| 1,231,334 | 5/1971 | United Kingdom |

*Primary Examiner*—Joseph L. Schofer
*Assistant Examiner*—A. L. Clingman
*Attorney, Agent, or Firm*—Plumley and Tyner

[57] ABSTRACT

Exhaust process for the dyeing of synthetic fiber materials from organic water-immiscible solvents wherein are used as dyestuffs sulphonamide group containing disperse dyestuffs. There are obtained without originating waste waters dyeings with excellent fastness to washing, rubbing, light and sublimation.

12 Claims, No Drawings

EXHAUST PROCESS FOR THE DYEING OF SYNTHETIC FIBER MATERIALS

This is a division of application Ser. No. 416,867 filed Nov. 19, 1973 which is a continuation of Ser. No. 161,282, filed July 9, 1971, now abandoned.

The invention relates to an exhaust process for the dyeing of synthetic fibre materials from organic water-immiscible solvents; more particlarly it concerns an exhaust process for the dyeing of synthetic fibre materials from organic water-immiscible solvents wherein are used as dyestuffs disperse dyestuffs containing sulphonamide groups.

Organic water-immiscible solvents suitable for the process according to the invention are those the boiling point of which lies betweem 40 and 170°C, e.g. aromatic hydrocarbons such as toluene, xylene; and halogenated hydrocarbons, especially aliphatic chlorinated hydrocarbons, such as methylene chloride, chloroform, carbon tetrachloride, 1,1-dichloroethane, 1,2-dichloroethane, 1,1,2-trichloroethane, 1,1,1,2-tetrachloroethane, 1,1,2,2-tetrachloroethane, pentachloroethane, 1-chloropropane, 2-chloropropane, 1,2-dichloropropane, 1,1,1-trichloropropane, 1-chlorobutane, 2-chlorobutane, 1,4-dichlorobutane, 1-chloro-2-methylpropane, 2-chloro-2-methylpropane or dichlorohexane; as well as aliphatic fluorinated and fluorochlorinated hydrocarbons, such as perfluoro-n-hexane, 1,2,2-trifluoro-trichloroethane and trifluoro-pentachloropropane; aromatic chlorinated and fluorinated hydrocarbons, such as chlorobenzene, fluorobenzene, chlorotoluene and benzotrifluoride.

Tetrachloroethylene, trichloroethylene, 1,1,1-trichloroethane and 1,1,1-trichloropropane have proved particularly satisfactory. Mixtures of said solvents can also be used.

The sulphonamide group-containing disperse dyestuffs to be used according to the invention may be based on any type of dyestuffs, provided these contain at least one sulphonamide group. The dyestuffs to be used according to the invention may belong, for example, to the series of metal-containing or metal-free mono- or polyazo dyestuffs or (azo)methine dyestuffs; to the series of anthraquinone dyestuffs and of condensation products thereof containing more than three fused rings; other suitable dyestuffs are oxazine, nitrodiphenylamine, naphthalic acid, di- and triphenylmethane dyestuffs; naphtholactam condensation dyestuffs, quinophthalone dyestuffs, and dyestuffs based on naphthoquinone and naphthoquinonimine; as well as other condensation dyestuffs. In addition to the sulphonamide groups required by definition, the dyestuffs may contain other conventional substituents, such as halogen, alkyl, cycloalkyl, aralkyl, aryl, alkoxy, aryloxy, nitro, sulphone, optionally substituted carboxamide groups, optionally substituted or acylated amino groups, alkylthio and arylthio, hydroxy, hydroxyalkyloxy, aminoalkyloxy, cyano, cyanoalkyl, and differently substituted alkyl, aryl, aralkyl radicals, and the like.

The dyestuffs contain one or more sulphonamide groups which are linked to the aromatic nuclei of the basic ring system of the dyestuff itself or to aryl, aralkyl, or aliphatic groupings in external positions. The numer of sulphonamide groups preferably amounts to 1 to 3.

The sulphonamide groups are characterized by the formula

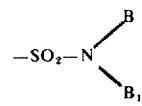

in which the radicals B and $B_1$, independently of one another, denote hydrogen or optionally substituted lower alkyl or alkenyl groups, aryl radicals or heteroaryl radicals. Furthermore, the radicals B and $B_1$ together may form a ring which may be interrupted by hetero atoms.

Examples of radicals B and $B_1$ are the methyl, ethyl or trifluoromethyl radicals; the $\beta$-hydroxy, $\beta$-chloro, $\beta$-bromo, $\beta$-methoxy, $\beta$-methylthio, $\beta$-methylsulphonyl or $\beta$-cyanoethyl groups; or an ethylene or $\beta$-chloro- or $\beta$-bromoethylene radical. If B or $B_1$ stands for an aryl radical, this is preferably a phenyl radical which may be substituted by one or more halogen atoms such as fluorine, chlorine or bromine; nitro groups; trifluoromethyl, hydroxy or lower alkoxy radicals; carboxyl or carboxamide groups; acylamino groups; sulphonamide or lower alkylsulphonyl radicals. Suitable heteroaryl radicals are, for example, the pyridyl, pyrrolyl, pyrimidinyl, furanyl, thienyl or sulpholanyl radicals. Examples of rings which may be formed by B and $B_1$ and may be interrupted by hetero atoms are the pyrrolidinyl, piperidinyl, morpholinyl, thiomorpholinyl or thiomorpholinyl dioxide rings.

Dyestuffs containing sulphonamide groups are known in large numbers and are prepared by conventional methods in that suitable dyestuff intermediates containing one or more sulphonamide groups linked to the nucleus or in an external position are converted into the desired final products while retaining the sulphonamide groups and, if desired, further conversion reactions are carried out in the latter. Obviously, it is also possible to start from dyestuffs containing one or more sulphonic acid groups and to convert the sulphonic acid groups into the corresponding amides in the usual way via reactive intermediate stages, such as e.g. the ester and acid chloride. In the case of azo dyestuffs, the usual conversion reactions are diazotisation and coupling; for most other dyestuffs classes they are condensation reactions.

Examples of suitable azo dyestuffs containing sulphonamide groups are the following compounds in which the radical

may have the following meaning:

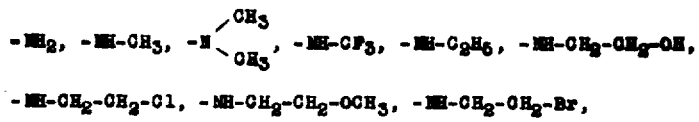

-NH-CH$_2$-CH$_2$-S-CH$_3$, -NH-CH$_2$-CH$_2$-SO$_2$-CH$_3$, -NH-CH$_2$-CH$_2$-CN,
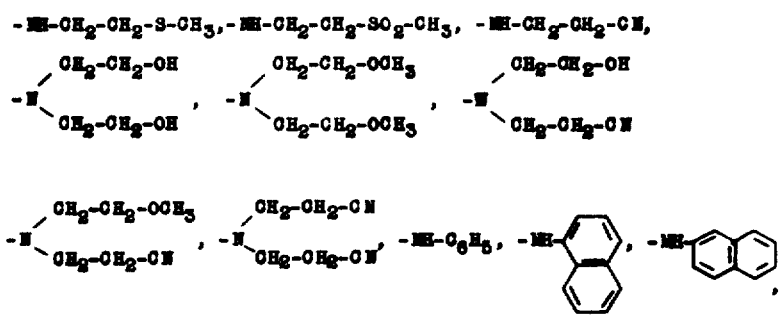
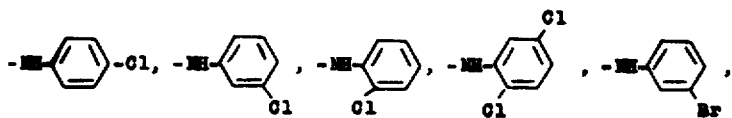
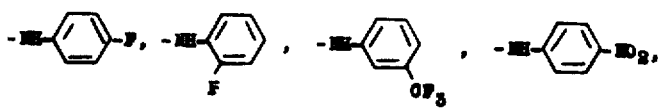
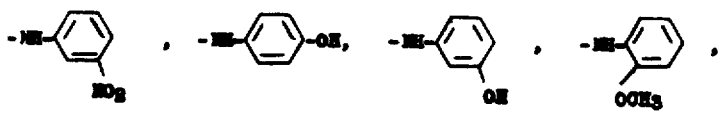
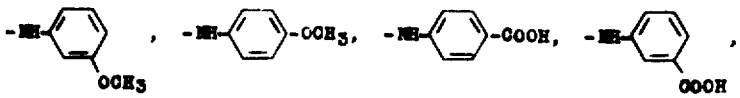
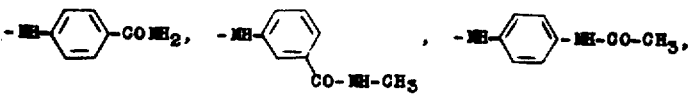
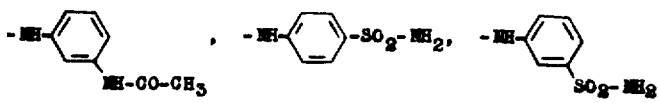
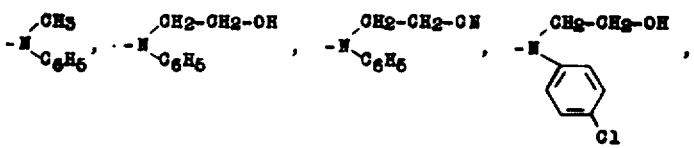
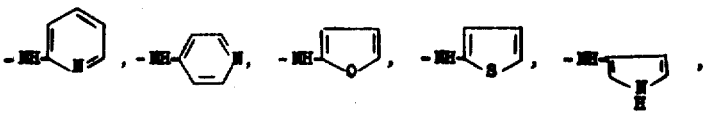

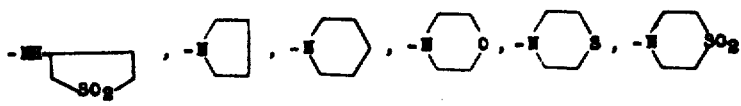

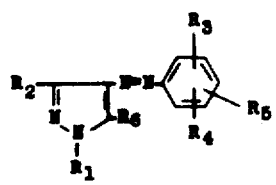

$R_1$ = H, $C_2H_5$, $CH_2CH_2OH$, $C_6H_5$, $C_6H_4Cl$, $C_6H_4COOH$, $CH_2.CH_2.CN$, $CH_2.CH_2.COOH$,

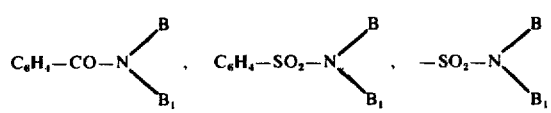

$R_2$ = $CH_3$, COOH,

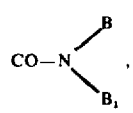

COO alkyl, Oalkyl
$R_3$, $R_4$, $R_5$ = H, $CH_3$, $C_2H_5$, $OCH_3$, $OC_2H_5$, $OCH_2COOH$, COOH, COOR, $OCH_2COOR$, $NO_2$, Cl, Br, CN (R = alkyl),

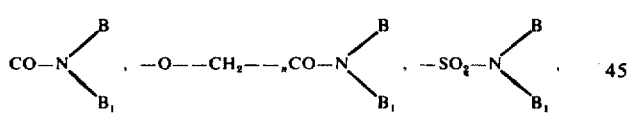

($n = 1 - 4$)
$R_6$ = OH, $NH_2$

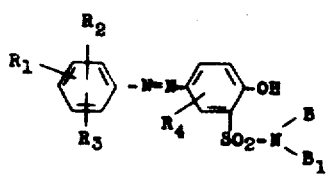

$R_1$, $R_2$, $R_3$ = H, $CH_3$, $C_2H_5$, $OCH_3$, $OC_2H_5$, Cl, Br, $OCH_2COOR$, $NO_2$, COOH, $OCH_2COOH$, COOR (R = alkyl), NH-acyl,

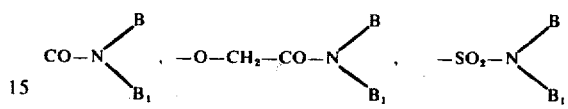

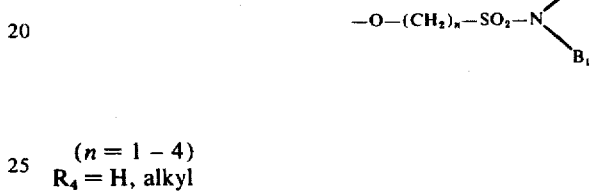

($n = 1 - 4$)
$R_4$ = H, alkyl

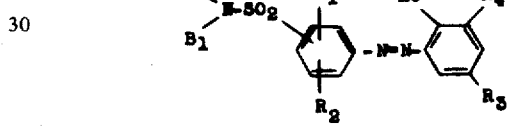

$R_1$, $R_2$ = H, $CH_3$, $C_2H_5$, $OCH_3$, $OC_2H_5$, Cl, Br, $NO_2$
$R_3$ = alkyl, cycloalkyl
$R_4$ = H, COOH,

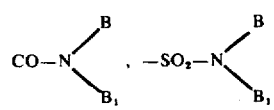

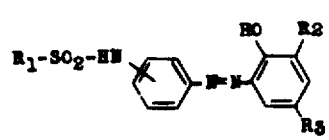

$R_1$ = alkyl, aryl,

$R_2$ = H, COOH,

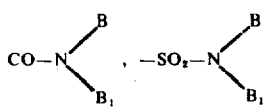

$R_3$ = alkyl, cycloalkyl

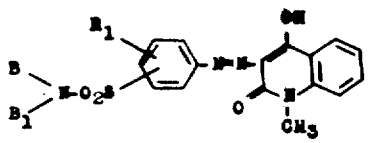

$R_1$ = H, $NO_2$, Cl

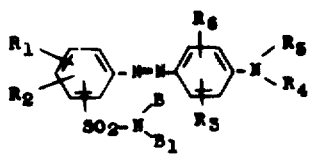

$R_1$, $R_2$ = H, $CH_3$, Cl, Br, $NO_2$, $OCH_3$, CN
$R_3$ = H, $CH_3$, $OCH_3$, $OC_2H_5$, $OC_6H_5$.
$R_4$, $R_5$ = H, $CH_3$, $C_2H_5$, $CH_2CH_2OH$, $CH_2.CH_2.CN$, $CH_2CH_2OR_7$ ($R_7$ = alkyl or acyl radical)
$R_6$ = H, NH.acyl,

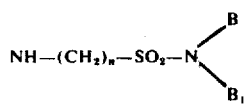

($n = 0 - 4$)

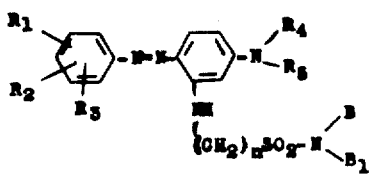

$R_1$, $R_2$, $R_3$ = H, $CH_3$, $C_2H_5$, $OCH_3$, $OC_2H_5$, $OCH_2COOH$, COOH, $OCH_2COOR$, COOR, $NO_2$, Cl, Br, CN,

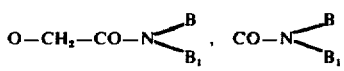

$R_4$, $R_5$ = $CH_3$, $C_2H_5$, $CH_2CH_2OH$, $CH_2.CH_2.CN$, $CH_2CH_2OR_6$ ($R_6$ = alkyl or acyl radical)
$n$ = 0, 1, 2, 3.

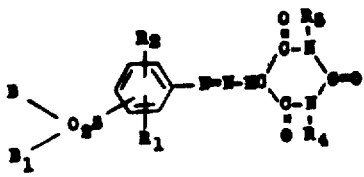

$R_1$, $R_2$ = H, $CH_3$, $C_2H_5$, $OCH_3$, $OC_2H_5$, $NO_2$, Cl, Br,
$R_4$, $R_5$ = $CH_3 C_2H_5$, $CH_2CH_2OH$.

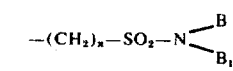

$R_1$, $R_2$ = H, $CH_3$, Cl, Br, $NO_2$, $OCH_3$,
$R_3$, $R_4$ = H, $CH_3$, $OCH_3$, $OC_2H_5$, NH.Acyl
$R_5$, $R_6$ = H, $CH_3$, $C_2H_5$, $CH_2CH_2OH$, $CH_2CH_2OR_7$ ($R_7$ = acyl radical),
$R_7$ = $-SO_2$-alkyl, $-SO_2$-aryl, $-(CH_2)_n-SO_2-N\begin{smallmatrix}B\\B_1\end{smallmatrix}$ ($n = 0 - 4$)

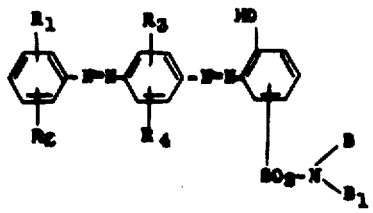

$R_1$, $R_2$, $R_3$ = H, $CH_3$, $C_2H_5$, $OCH_3$, $OC_2H_5$, Cl, Br, $NO_2$, COOH, $-CO-N\begin{smallmatrix}B\\B_1\end{smallmatrix}$, $-SO_2-N\begin{smallmatrix}B\\B_1\end{smallmatrix}$

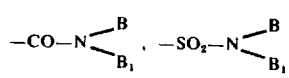

R, $R_2$ = H, OH, $OCH_3$, Cl, $NO_2$, $CH_3$
$R_3$, $R_4$ = H, $CH_3$, $OCH_3$, $C_2H_5$, $OC_2H_5$

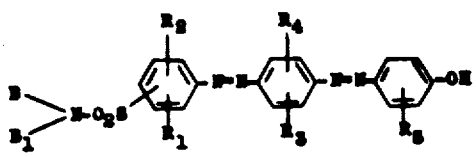

$R_1$, $R_2$ = H, OH, $OCH_3$, Cl, $NO_2$, $CH_3$,
$R_3$, $R_4$ = H, $CH_3$, $C_2H_5$, $OCH_3$, $OC_2H_5$,
$R_5$ = H, $CH_3$, $OCH_3$, COOH,

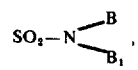

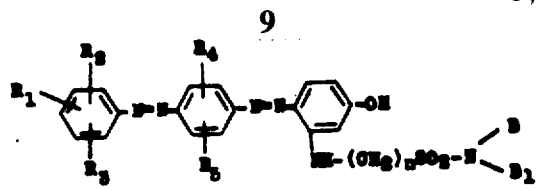

$R_1$, $R_2$, $R_3$ = H, $CH_3$, $C_2H_5$, Cl, Br, $OCH_2COOH$, $OCH_2COOR$,

COOH (R = alkyl), $OCH_2CO-N\begin{smallmatrix}B\\B_1\end{smallmatrix}$, $CO-N\begin{smallmatrix}B\\B_1\end{smallmatrix}$, $-SO_2-N\begin{smallmatrix}B\\B_1\end{smallmatrix}$ $R_4$, $R_5$ = H, $CH_3$, $C_2H_5$, $OCH_3$, $OC_2H_5$,
$n$ = 0, 1, 2, 3, 4.

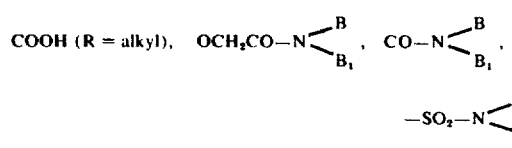

$R_1$, $R_2$, $R_3$, $R_4$, $R_5$ = H, $CH_3$, $C_2H_5$, $OCH_3$.

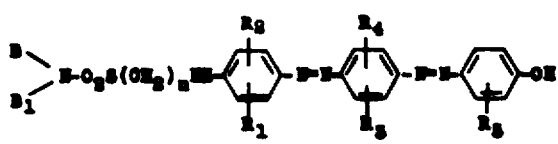

$R_1$, $R_2$, $R_3$, $R_4$ = H, $CH_3$, $C_2H_5$, $OCH_3$, Cl, $NO_2$, $-SO_2-N\begin{smallmatrix}B\\B_1\end{smallmatrix}$ $R_5$ = $CH_3$, COOH, COOalkyl, Oalkyl

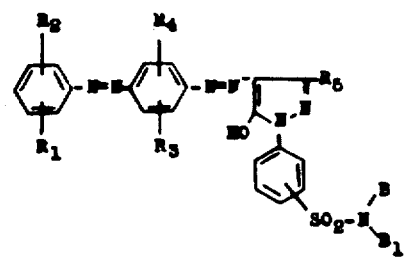

$R_1$, $R_2$ = H, Cl, $NO_2$

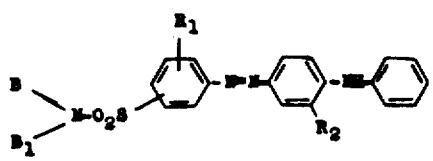

$R_1$, $R_2$, $R_3$, $R_4$ = H, $CH_3$, $C_2H_5$, $OCH_3$

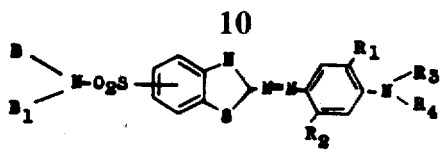

$R_1$ = H, $C_1-C_4$-alkyl, $C_1-C_4$-alkoxy, aryloxy
$R_2$ = H, hal, $C_1-C_4$-alkyl, $C_1-C_4$-alkoxy, -NH-acyl
$R_3$, $R_4$ = H, $CH_3$, $C_2H_5$, $CH_2.CH_2.OH$, $CH_2.OH_2.CH.O.acyl$, $CH_2.OH_2.ON$

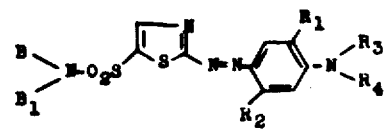

$R_1$ = H, $C_1-C_4$-alkyl, $C_1-C_4$-alkoxy, arloxy
$R_2$ = H, hal, $C_1-C_4$-alkyl, $C_1-C_4$-alkoxy, —NH-acyl
$R_3$, $R_4$ = H, $CH_3$, $C_2H_5$, $CH_2.CH_2.OH$, $.CH_2.CH_2.O.acyl$, $.CH_2.CH_2.ON$

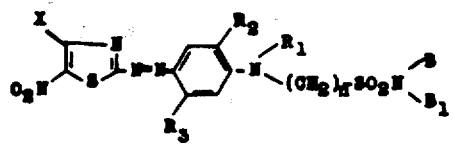

X = H, $CH_3$, n—$C_3H_7$, N—$C_4H_9$
$R_1$ = $CH_3$, $C_2H_5$, sec. $C_4H_9$, $CH_2CH_2OH$, $CH_2CH_2OOOOH_3$, $CH_2CH_2CN$,
$R_2$ = H, $C_1-C_4$-alkyl, $C_1-C_4$-alkoxy,
$R_3$ = H, hal, $C_1-C_4$-alkyl, $C_1-C_4$-alkoxy, —NH—CO—R' (R' = $C_1-C_6$-alkyl)
n = 0 - 4

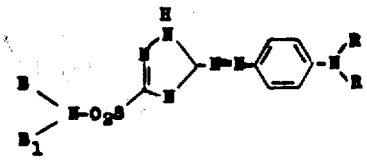

R = $CH_3$, $C_2H_5$, $C_4H_9$.

Suitable anthraquinone dyestuffs are, for example, those in which one or more sulphonamide groups stand in the anthraquinone molecule itself or in aryl or alkyl radicals which are linked to the anthraquinone molecule via bridge members such as amino, ether, thioether, sulphonamide or sulphonylamino groups.

The anthraquinone compounds may have the following constitutions, for example, the group $-N\begin{smallmatrix}B\\B_1\end{smallmatrix}$ having the same meaning as above:

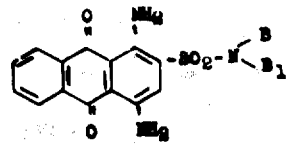

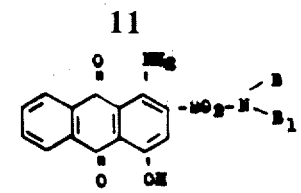
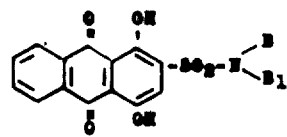
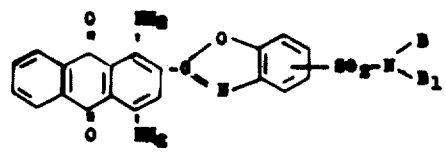
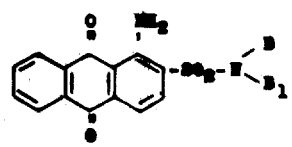
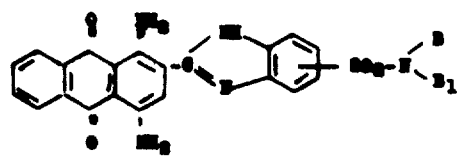
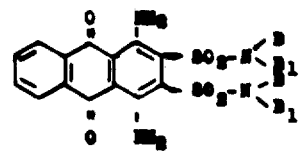
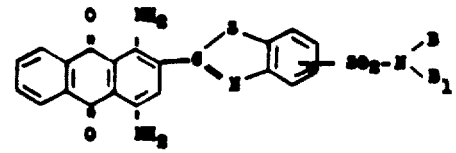
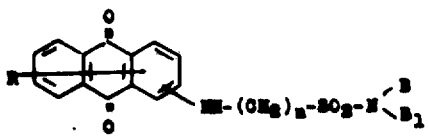
R = hal, OCH₃, OH    n = 1 – 4
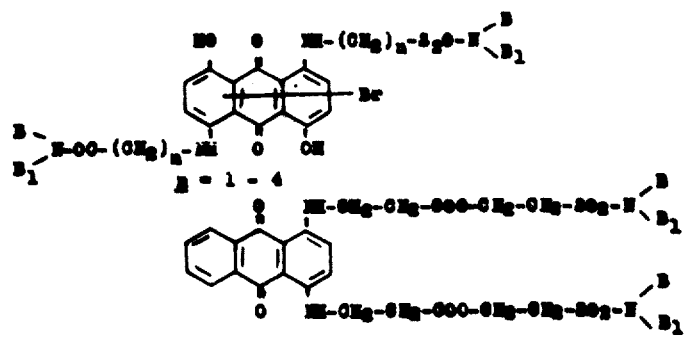
n = 1 – 4

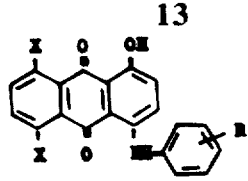
one X = OH,
the other X = NO₂, NH₂,
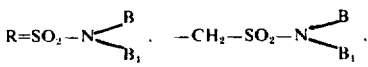
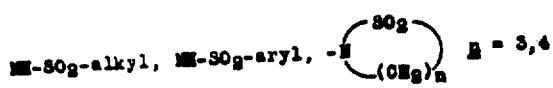
furthermore, acylation products of amino-anthraquinones, e.g. of the formulae:
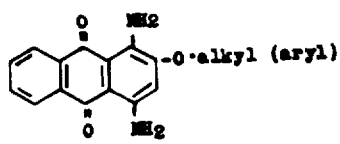
with sulpho-carboxylic acids of the general formula
$$HOOC-X-SO_2-N\genfrac{}{}{0pt}{}{B}{B_1}$$
X = alkylene, arylene, a bivalent heterocyclic radical, or with a compound of the formula
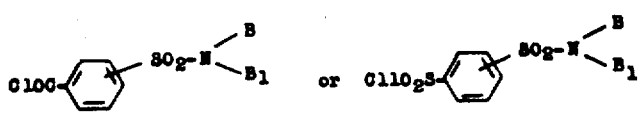
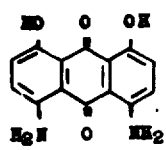 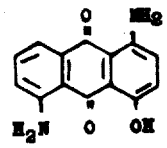
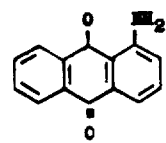 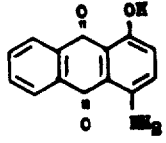
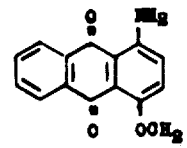 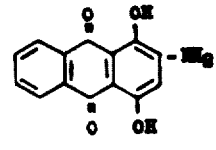
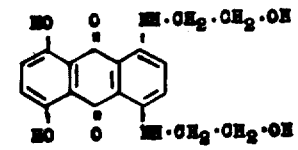 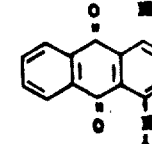
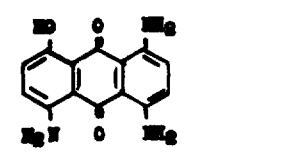
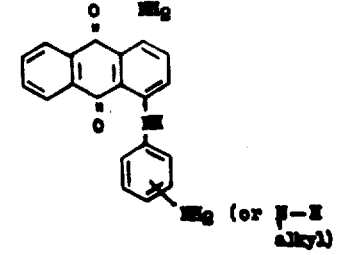
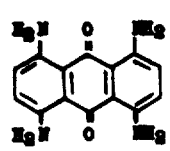 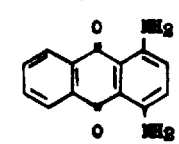

and furthermore, the anthraquinone dyestuffs assembled in the following Table:

| Structure | $-O-C_1-C_4\text{-alkylene}-SO_2-N\binom{B}{B_1}$ | $-C_1-C_2\text{-alkylene}-SO_2-N\binom{B}{B_1}$ | $-S-C_1-C_4\text{-alkylene}-SO_2-N\binom{B}{B_1}$ | $-O-\bigcirc-SO_2-N\binom{B}{B_1}$ | $-S-\bigcirc-SO_2-N\binom{B}{B_1}$ | $-NH-\bigcirc-SO_2-N\binom{B}{B_1}$ | $-NH-O-C_1-C_4\text{-alkylene}-SO_2-N\binom{B}{B_1}$ | $-NH-C_1-C_2\text{-alkylene}-SO_2-N\binom{B}{B_1}$ | $-NH-S-C_1-C_4\text{-alkylene}-SO_2-N\binom{B}{B_1}$ |
|---|---|---|---|---|---|---|---|---|---|
| 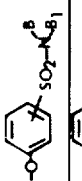 |  |  | X |  | X |  |  |  |  |
| 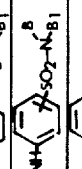 |  | X | X |  | X | X |  |  |  |
|  |  | X | X |  | X | X | X | X | X |
| 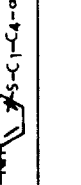 | X | X | X | X |  |  |  |  |  |
|  | X | X X |  |  | X | X |  |  |  |
| 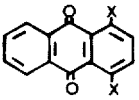 |  | X | X |  | X | X | X | X | X |
| 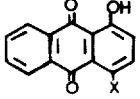 |  | X | X |  | X | X | X | X | X |
| 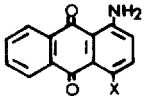 |  | X X |  | X X | X | X |  |  |  |
| 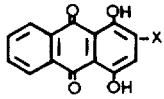 |  | X X |  | X X | X X |  |  |  |  |

The anthraquinone dyestuffs of the formula

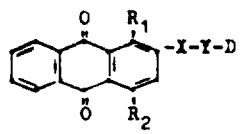

in which
R₁ means an amino group
R₂ means a hydroxy or amino group
X means —O— or —S—
Y means a phenylene group and
D means

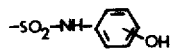

have proved to be of special interest and among them the dyestuffs

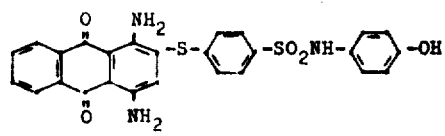 and

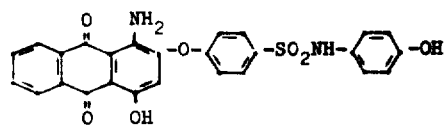

have proved to be especially valuable.

Among anthraquinone condensation products which contain sulphonamide groups and contain more than three fused rings, the following may be mentioned by way of example: Isothiazoloanthrones, such as

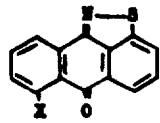

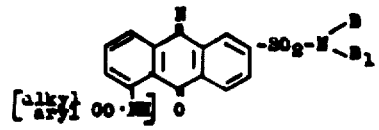

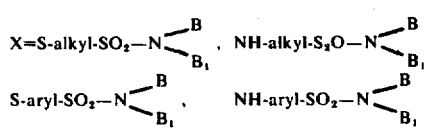

Pyrazoloanthrones, such as

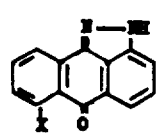 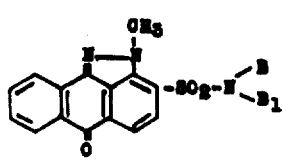

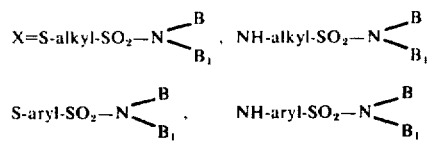

furthermore, dyestuffs of the type

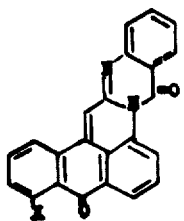 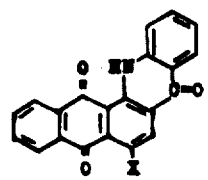

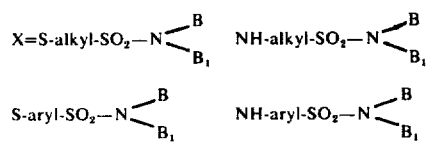

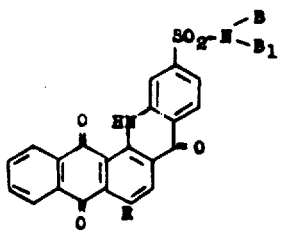 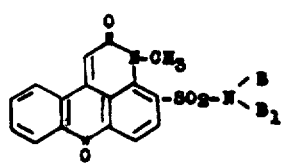

R = H, NH₂

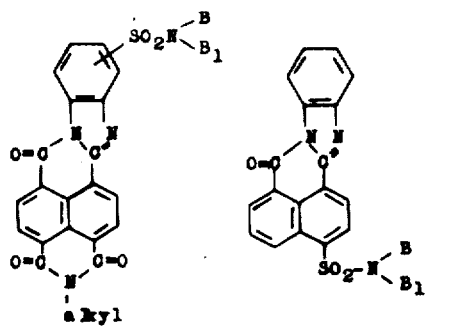

Anthraquinone dyestuffs of the formulae given above are prepared according to the synthesis principles known in anthraquinone chemistry. Condensation reactions with appropriate starting compounds are suitable in the first instance for this purpose. For example, amino group-containing anthraquinone compounds in which the amino groups stand either in an external position or, preferably, in a position linked to the nucleus, can be condensed with suitable sulphoaryl-acid halides or anhydrides, e.g. sulphophenyl- or naphthyl-carboxylic acid or -sulphonic acid chlorides or bromides to form the corresponding acid amides; or, for example, anthraquinone compounds with mobile halogen atoms can be reacted with sulphoaryl-amines such as sulphophenyl- or sulphonaphthyl-amines to form the corresponding sulphoarylamino-anthraquinone derivatives, and the free sulpho groups still present in the resultant dyestuffs can be converted into sulphonamide groups in known manner. Alternatively, for example, anthraquinone compounds containing amino groups can be condensed with sulphonamido-aryl-acid halides or anhydrides, or e.g. anthraquinone compounds containing mobile halogen atoms can be condensed with sulphonamido-arylamines.

Anthraquinone ether and thioether derivatives in which sulphonamide groups are contained in alkyl, aralkyl or aryl radicals of the ether or thioether component, can be prepared according to similar synthesis principles. Another possibility of synthetising sulphonamide group-containing anthraquinone dyestuffs to be used according to the invention consists in that anthraquinone-acid halides, such as carboxylic acid and sulphonic acid chlorides or bromides, are converted into the corresponding amides or esters with the aid of suitable amino or hydroxy compounds which contain at least one additional sulphonamide group. Obviously, it is also possible to use for the present process also those anthraquinone compounds in which one or more sulphonamide groups stand in a position linked to the nucleus or in which sulphonamide groups linked to the nucleus as well as externally linked sulphonamide groups are present.

As representatives of nitro dyestuffs containing sulphonamide groups, there may be mentioned for example dyestuffs of the formula

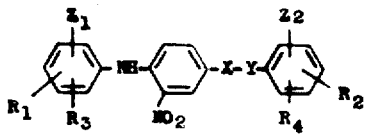

$X = -SO_2-$ or $-CO-$
$Y = -NH-$ or $-O-$
$Z_1$ and/or $Z_2 =$

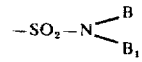

$R_1, R_2 = H, Cl, Br, F, CH_3, C_2H_5, CH_3O, OH, CN, NO_2,$
$R_3, R_4 = CF_3, COOH, O-CH_2-COOH, -O-CH_2-CH_2-COOH, -COOalkyl, -NH-acyl,$

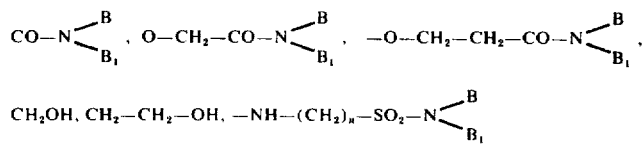

$CH_2OH, CH_2-CH_2-OH, -NH-(CH_2)_n-SO_2-N\begin{matrix}B\\B_1\end{matrix}$ or dyestuffs of the formula

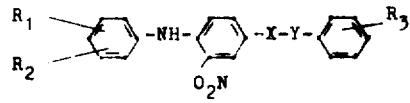

in which
$R_1$ means hydrogen, a halogen atom, a trifluoro, cyano, hydroxy, $C_1-C_4$-alkyl or -alkoxy, a hydroxymethyl or -ethyl, a hydroxy-ethylene-oxy, acylamino, alkylsulphonyl-amino, alkylsulphone, carboxamido, aminosulphonyl-alkyleneamino or sulphonamide group;
$R_2$ means hydrogen or a $C_1-C_4$-alkoxy group;
$R_3$ means hydrogen, a halogen atom, a hydroxy, hydroxy-ethyleneoxy, carboxamido, aminosulphonyl-alkyleneoxy or sulphonamide group;
X stands for the group $-SO_2-$ or $-CO$; and
Y stands for $-NH-$ or $-O-$;
with the proviso that one of the radicals $R_1$, $R_3$ or

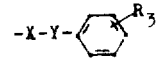

is a sulphonamide group or a radical containing a sulphonamide group.

The nitro dyestuff of the formula

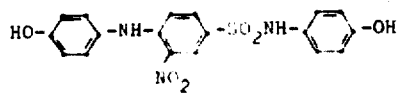

has proved to be especially valuable.

In many cases it has proved advantageous for the dyebaths to contain small amounts of water, i.e. up to 1 percent by weight, preferably 0.5 percent by weight, referred to the weight of the organic solvent.

Furthermore, it has proved expedient in some cases to add non-ionic auxiliaries to the dyebaths. Suitable nonionic auxiliaries are primarily the known interface-active ethoxylation and propoxylation products of fatty alcohols, alkylphenols, fatty acid amides and fatty acids as well as mixtures thereof; the auxiliaries are used in an amount of 0.05 – 2 percent by weight, referred to the weight of the organic solvents. Instead of being immediately added to the dyebaths, the auxiliaries can also be used to advantage for pasting the sulphonamide group-containing dyestuffs and in this way be added to the dyebaths in the form of a dyestuff/auxiliary paste.

The synthetic fibre materials to be dyed according to the invention are primarily fibre materials of polyesters, such as polyethylene terephthalate, polycyclohexanedimethylene terephthalate, heterogeneous polyesters from terephthalic acid, sulphoisophthalic acid and ethylene glycol, or copolyether ester fibres from p-hydroxybenzoic acid, terephthalic acid and ethylene glycol; cellulose triacetate, cellulose 2½-acetate; polyacrylonitrile; synthetic polyamides such as hexamethylene-diamine adipate, poly-ε-caprolactam or 4-aminoundecanic acid; and polyurethanes. The fibre materials may be present in the most varied stages of processing, for example, as threads, loose material, combed material, yarn, as piece goods such as fabrics or knitted fabrics, or as ready-made goods.

Dyeing according to the invention is preferably carried out in closed apparatus, for example, by introducing the fibre materials at room temperature into the dyebath, heating the dyebath to 60° – 170°C and keeping it at this temperature until the bath is exhausted; this is usually the case after 10 – 60 minutes. After cooling to room temperature, the liquor is separated and the fibre materials are freed from any adhering solvent, optionally after a short rinsing with fresh organic solvent, by filtering with suction or by centrifuging and subsequent drying in a warm current of air. With the aid of the process according to the invention it is possible to dye synthetic fibre materials from organic solvents in a simple way, high dyestuff yields and excellent fastness properties being achieved.

The sulphonamide group-containing dyestuffs to be used according to the invention are largely insoluble in the organic water-immiscible solvents. They are distinguished from the dyestuffs hitherto used for dyeing synthetic fibre materials from organic solvents by their substantially better affinity and an increased fastness to sublimation.

It may be mentioned that mixtures of the dyestuffs to be used according to the invention sometimes give a better dyestuff yield than the individual dyestuffs.

The parts given in the following Examples are parts by weight.

EXAMPLE 1

100 Parts of a fabric of textured polyethylene terephthalate fibres are introduced at room temperature, without previous cleaning, into a dyebath prepared from 1 part of the monoazo dyestuff 4-aminobenzene-sulphonic acid amide → 3-methyl-pyrazolone-(5) and 1000 parts tetrachloroethylene.

The bath is heated to 115°C within 10 minutes and kept at the same temperature for 30 minutes, while the liquor is vividly circulating. The liquor is then separated and the dyed material is rinsed with fresh solvent at about 40°C for 5 minutes. After separating of the rinsing liquor, the dyed material is centrifuged and dried in an air current. A strong yellow dyeing of excellent fastness to sublimation and very good fastness to washing and light is obtained.

An equally satisfactory yellow dyeing was obtained in the same way on a fabric of polycyclohexane-dimethylene terephthalate fibres.

Yellow dyeings of equally satisfactory fastness properties were also obtained when the dyestuff mentioned above was replaced with the same amount of one of the following monoazo dyestuffs:

| Example | Dyestuff | Shade |
|---|---|---|
| 2 | 3-nitro-4-amino-benzene-sulphonic acid amide → 3-methyl-pyrazolone-(5) | yellow |
| 3 | 2-amino-benzene-sulphonic acid amide → 3-methyl-pyrazolone-(5) | yellow |
| 4 | 2,5-dimethoxy-aniline → 3-methyl-5-pyrazolone-1-sulphonic acid amide | yellow |
| 5 | 2-nitro-aniline → 3-methyl-5-pyrazolone-1-sulphonic acid methylamide | yellow |
| 6 | 4-methoxy-3-amino-benzene-sulphonic acid n-butylamide → 1-phenyl-3-methyl-5-pyrazolone | yellow |
| 7 | 3-nitro-4-amino-benzene-sulphonic acid amide → 1-phenyl-3-methoxy-5-amino-pyrazole | orange |
| 8 | 2-nitro-4-chloro-aniline → 1-(3-morpholino-sulphonyl-phenyl)-3-ethoxy-5-amino-pyrazole | orange |
| 9 | 4-amino-benzene-sulphonic acid amide → 1-phenyl-5-pyrazolone-3-carboxylic acid ethyl ester | yellow |
| 10 | 4-amino-benzene-sulphonic acid amide → 1-(3-carboxyphenyl)-3-methyl-5-pyrazolone | yellow |
| 11 | 4-amino-benzene-sulphonic acid ethylamide → 1-phenyl-5-pyrazolone-3-carboxylic acid | yellow |
| 12 | 4-amino-benzene-sulphonic acid dimethylamide → 1-phenyl-5-pyrazolone-3-carboxylic acid amide | yellow |
| 13 | 3-nitro-4-amino-benzene-sulphonic acid amide → 1-phenyl-5-pyrazolone-3-carboxylic acid ethyl ester | yellow |
| 14 | 2-methoxy-4-nitro-aniline → 1-(3-amino-sulphonyl-phenyl)-3-methyl-5-pyrazolone | yellow |
| 15 | 4-amino-benzene-sulphonic acid-(di-2-hydroxyethyl)-amide → 1-(2-cyanoethyl)-3-methyl-5-pyrazolone | yellow |
| 16 | 4-amino-benzene-sulphonic acid ethylamide → 1-(2-carboxyethyl)-3-methyl-5-pyrazolone | yellow |
| 17 | 2-cyano-4-nitro-aniline → 1-(3-amino-sulphonyl-phenyl)-3-methyl-5-pyrazolone | yellow |
| 18 | 4-methyl-aniline → 1-(3-phenylamino-sulphonyl-phenyl)-3-methyl-5-pyrazolone | yellow |
| 19 | 4-amino-benzene-sulphonic acid-dimethylamide → 1-(3-aminosulphonyl-phenyl)-3-methyl-5-pyrazolone | yellow |
| 20 | 3-nitro-4-amino-benzene-sulphonic acid dimethylamide → 1-(3-chlorophenyl)-5-pyrazolone-3-carboxylic acid | yellow |
| 21 | 2-methoxy-5-nitro-aniline → 1-(2-amino-sulphonyl-ethyl)-3-methyl-5-pyrazolone | yellow |
| 22 | 2-bromo-4-nitro-aniline → 1-hydroxy-benzene-2-sulphonic acid-(di-2-cyanoethyl)- | yellow |

-continued

| Example | Dyestuff | Shade |
|---|---|---|
|  | amide |  |
| 23 | 4-ethoxy-aniline   1-hydroxy-3-methyl-benzene-2-sulphonic acid-(4-chlorophenyl)-amide | yellow |
| 24 | 4-(4-pyrrolidinosulphonylbutoxy)-aniline   1-hydroxy-benzene-2-sulphonic acid (2-pyridino)-amide | yellow |
| 25 | 3-amino-benzoic acid   1-hydroxy-benzene-2-sulphonic acid-(3-sulpholanyl)-amide | yellow |
| 26 | 4-amino-benzene-sulphonic acid amide   1-hydroxy-4-methyl-benzene | yellow |
| 27 | 2-amino-benzene-sulphonic acid amide   1-hydroxy-4-cyclohexyl-benzene | yellow |
| 29 | 3-nitro-4-amino-benzene-sulphonic acid amide   1-hydroxy-4-methyl-benzene | yellow |
| 29 | 3-nitro-5-chloro-4-amino-benzene-sulphonic acid   1-hydroxy-4-methyl-benzene | yellow |
| 30 | 4-amino-benzene-sulphonic acid-piperidide   1-hydroxy-4-methyl-benzene-2-carboxylic acid | yellow |
| 31 | 4-amino-benzene-sulphonic acid-(2-methyl-sulphonylethyl)-amide   1-hydroxy-4-methyl-benzene-2-sulphonic acid amide | yellow |
| 32 | 4-methylsulphonylamino-aniline   1-hydroxy-4-n-propyl-benzene | yellow |
| 33 | 4-phenylsulphonylamino-aniline   1-hydroxy-4-methyl-benzene | yellow |
| 34 | 4-dimethylamino-sulphonylamino-aniline   1-hydroxy-4-ethyl-benzene | yellow |
| 35 | 4-methylsulphonylamino-aniline   1-hydroxy-4-methyl-benzene-2-carboxylic acid amide | yellow |

EXAMPLE 36

100 Parts of a fabric of triacetate fibres are introduced at room temperature into a dyebath prepared from
1 part of the monoazo dyestuff 4-methyl-sulphonylamino-aniline   1-hydroxy-4-methyl-benzene and
1000 parts tetrachloroethylene.

The bath is heated to 110°C within 20 minutes and kept at the same temperature for 45 minutes while the liquor is vividly circulating. The liquor is then separated and the fabric is rinsed with fresh tetrachloroethylene at 40°C. After separation of the rinsing liquor, the dyed materials is freed from the adhering solvent by centrifuging and drying in an air current. A full brilliant yellow dyeing of excellent fastness properties is obtained.

EXAMPLE 37

100 Parts of yarn of acetate threads are introduced at about 22°C into a dyebath prepared from
1 part of the monoazo dyestuff 4-piperidyl-sulphonylamino-aniline   1-hydroxy-4-methylbenzene,
1000 parts tetrachloroethylene
1.5 parts oleic acid ethanolamide
1.5 parts oleyl alcohol eicosaethylene glycol ether and
6 parts of water.

The bath is heated to 78°C within 20 minutes and kept at the same temperature for 45 minutes. After separation of the dye liquor and rinsing with fresh tetrachloroethylene, the dyed material is freed from the adhering solvent by filtering with suction and drying in an air current. A brilliant yellow dyeing is obtained.

EXAMPLE 38

100 Parts of yarn of polyacrylonitrile fibres are dyed in a dyebath prepared as described in Example 36. The bath is heated to 100°C within 20 minutes and kept at the same temperature for 30 minutes. After the usual washing and drying, there is obtained a yellow dyeing of good fastness properties.

EXAMPLE 39

100 Parts of a fabric of polyethylene terephthalate fibres are heated in a dyebath containing
1 part of the monoazo dyestuff 3-nitro-4-aminobenzene-sulphonic acid amide   1-methyl-2,4-dihydroxy-quinoline in
1000 parts tetrachloroethylene
to 115°C within 10 minutes and dyed at the same temperature for 30 minutes. After separation of the liquor, rinsing and drying, there is obtained a brilliant greenish yellow dyeing of very good fastness to sublimation, washing and light.

When the above dyestuff was replaced with the same amount of one of the dyestuffs listed in the following Table, dyeings of equally satisfactory fastness properties were obtained in the shades stated in the Table:

| Example | Dyestuff | Shade |
|---|---|---|
| 40 | 4-amino-benzene-sulphonic acid amide   1-methyl-2,4-dihydroxy-quinoline | yellow |
| 41 | 4-trifluoromethyl-2-amino-benzene-sulphonic acid amide   1-methyl-2,4-dihydroxy-quinoline | yellow |
| 42 | 4-chloro-3-amino-benzene-sulphonic acid (2-hydroxyethyl)amide   1-methyl-2,4-dihydroxy-quinoline | yellow |
| 43 | 4-amino-benzene-sulphonic acid-(di-2-hydroxyethyl)-amide   1-methyl-2,4-dihydroxy-quinoline | yellow |
| 44 | 3-amino-benzene-sulphonic acid-(2-methyl-thioethyl)-amide   1-methyl-2,4-dihydroxy-quinoline | yellow |
| 45 | 4-amino-benzene-sulphonic acid-(1-naphthyl)-amide   1-methyl-2,4-dihydroxy-quinoline | yellow |
| 46 | 3,5-dichloro-4-amino-benzene-sulphonic acid dimethyl-amide   N-(2-cyanoethyl)-N-ethyl-aniline | yellow |
| 47 | 3,6-dichloro-4-amino-benzene-sulphonic acid dimethyl-amide   N-(2-cyanoethyl)-N-ethyl-aniline | orange |
| 48 | 3-nitro-4-amino-benzene-sulphonic acid amide   N,N-(di-2-acetoxyethyl)-aniline | reddish yellow |
| 49 | 3-nitro-5-bromo-4-amino-benzene-sulphonic acid amide   N,N-(di-2-acetoxyethyl)-aniline | yellowish red |

-continued

| Example | Dyestuff | Shade |
|---|---|---|
| 50 | 3-nitro-4-amino-benzene-sulphonic acid amide    3-methyl-N,N-(di-2-acetoxy-ethyl)-aniline | reddish yellow |
| 51 | 3-cyano-5-nitro-4-amino-benzene-sulphonic acid methylamine    N-ethyl-N-(2-acetoxy-ethyl)-aniline | yellowish red |
| 52 | 3,5-dicyano-4-amino-benzene-sulphonic acid amide    N,N-dimethyl-aniline | red |
| 53 | 3-chloro-5-nitro-2-amino-benzene-sulphonic acid amide    N,N-(di-2-propionyloxy-ethyl)-aniline | red |
| 54 | 3-chloro-5-nitro-2-amino-benzene-sulphonic acid    N,N-(di-2-methoxycarbonyl-ethyl)-aniline | red |
| 55 | 3-cyano-5-nitro-2-amino-benzene-sulphonic acid amide    3-methyl-N,N-(di-2-methoxycarbonyloxy-ethyl)-aniline | bluish red |
| 56 | 3,5-dichloro-4-amino-benzene-sulphonic acid methylamide    N-(2-pyrrolidylcarbonyl-ethyl)-aniline | orange |
| 57 | 3-cyano-5-bromo-4-amino-benzene-sulphonic acid diethylamide    N-[2-(3-methyl-phenylamino)-ethyl]-succinimide | reddish orange |
| 58 | 5-methyoxy-2-amino-benzene-sulphonic acid amide    N-(2-cyanoethyl)-N-(2-hydroxy-ethyl)-aniline | yellowish red |
| 59 | 3-bromo-5-nitro-4-amino-benzene-sulphonic acid amide    3-acetylamino-N,N-dimethyl aniline | violet |
| 60 | 3-bromo-5-cyano-4-amino-benzene-sulphonic acid amide    3-acetylamino-N,N-diethyl-aniline | red-violet |
| 61 | 3,5-dicyano-4-amino-benzene-sulphonic acid amide    3-acetylamino-N,N-dimethylaniline | violet |
| 62 | 3-bromo-5-nitro-4-amino-benzene-sulphonic acid amide    2-methoxy-5-acetylamino-N,N-dimethyl-aniline | violet |
| 63 | 3-chloro-5-nitro-2-amino-benzene-sulphonic acid amide    2-phenoxy-5-acetylamino-N,N-dimethyl-aniline | violet |
| 64 | 2-bromo-4,6-dinitro-aniline    3-methyl-sulphonylamino-N,N-dimethylaniline | violet |
| 65 | 2-bromo-4-nitro-6-cyano-aniline    3-chloromethylsulphonylamino-N-(2-cyanoethyl)-aniline | blue-violet |
| 66 | 2,6-dicyano-4-nitro-aniline    3-methylsulphonylamino-N,N-dimethyl-aniline | blue |
| 67 | 2-bromo-4,6-dinitro-aniline    3-phenyl-sulphonylamino-N,N-dimethyl-aniline | violet |
| 68 | 2-chloro-4,6-dinitro-aniline    3-methylsulphonylamino-N-(2-hydroxy-ethyl)-N-(2-cyanoethyl)-aniline | violet |
| 69 | 2-bromo-4,6-dinitro-aniline    2-methoxy-5-methysulphonylamino-N,N-(di-2-acetoxyethyl)-aniline | blue |
| 70 | 2,6-dichloro-aniline    3-dimethyl-sulphonyl-amino-N,N-(di-2-acetoxy-ethyl)-aniline | reddish yellow |
| 71 | 3-bromo-5-nitro-4-amino-benzene-sulphonic acid amide    3-methylamino-sulphonylmethylamino-N,N-dimethyl-aniline | brown |
| 72 | 2-chloro-4-nitro-6-cyano-aniline    3-(3-ethylaminosulphonylpropylamino)-N,N-diethyl-aniline | brown |
| 73 | 2,6-dichloro-4-nitro-aniline    N-ethyl-N-(2-dimethylaminosulphonyl-ethyl)-aniline | yellow-brown |
| 74 | 4-dimethylsulphonylamino-aniline    3-methyl-N,N-(di-2-acetoxyethyl)-aniline | reddish yellow |
| 75 | 3-nitro-5-amino-benzene-sulphonic acid (2-hydroxyethyl)-amide    N-(2-methoxy-ethyl)-N-(2-methoxycarbonylethyl)-aniline | orange |
| 76 | 2-bromo-4,6-dinitro-aniline    N-methyl-sulphonyl-aniline | yellow |
| 77 | 2,5-dichloro-aniline    3-methyl-N-ethyl-N-(2-methylsulphonylamino-ethyl)-aniline | reddish yellow |
| 78 | 4-amino-benzene-sulphonic acid methyl-amide    N-phenylaniline | yellow |
| 79 | 4-amino-benzene-sulphonic acid-thio-morpholid-S-dioxide | yellow |
| 80 | 4-(3-methylaminosulphonyl-benzoyl-amino)-aniline    4-methyl-phenol | yellow |
| 81 | 6-methylaminosulphonyl-2-amino-1,3-benzothiazole    N-(2-cyanoethyl)-N-(2-acetoxyethyl-)aniline | red |
| 82 | 6-aminosulphonyl-2-amino-1,3-benzo- | red |

-continued

| Example | Dyestuff | Shade |
|---|---|---|
| | thiazole    N,N-(di-2-cyanoethyl)-aniline | |
| 83 | 3-chloro-4-amino-benzene-sulphonic acid amide    3-acetylamino-N,N-diethyl-aniline | orange |
| 84 | 5-methylaminosulphonyl-2-amino-1,3-thiazole    N-ethyl-N-(2-carboxyethyl)-aniline | bluish red |
| 85 | 5-aminosulphonyl-2-amino-1,3-thiazole    3-acetylamino-N,N-dimethyl-aniline | red-violet |
| 86 | 4-(4-aminosulphonylphenyl)-2-amino-1,3,5-thiadiazole    N,N-(di-2-acetoxyethyl)-aniline | yellowish red |
| 87 | 4-(4-methylaminosulphonylphenyl)-2-amino-1,3,5-thiadiazole    3-acetylamino-N,N-dimethyl-aniline | red |
| 88 | 4-methylsulphonylamino-aniline    3-methyl-N,N(di-2-acetoxyethyl)-aniline | orange |
| 89 | 4-phenylsulphonylamino-2-chloro-aniline    3-acetylamino-aniline | reddish orange |
| 90 | 2-chloro-4-nitro-aniline    2-amino-naphthalene-6-sulphonic acid methylamide | red |
| 91 | 2-chloro-4-nitro-aniline    2-amino-naphthalene-6-sulphonic acid amide | red |
| 92 | 4-methylsulphonylamino-2-nitro-aniline    2-hydroxynaphthalene | red |
| 93 | 4-methylsulphonylamino-aniline    2-aminonaphthalene-5-sulphonic acid methylamide | red |
| 94 | 4-amino-benzene-sulphonic acid amide    1,2-dimethyl-indole | yellow |
| 95 | 4-aminoazobenzene    2-hydroxy-naphthalene-6-sulphonic acid-N-methyl-N-(2-hydroxyethyl)-amide | red |
| 96 | 4-aminoazobenzene    2-hydroxy-naphthalene-6-sulphonic acid-N-methyl-N-(2-acetoxyethyl)-amide | red |
| 97 | 4-amino-azobenzene-4'-sulphonic acid amide    2-hydroxynaphthalene | red |
| 98 | 3-chloro-5-amino-benzene-sulphonic acid amide    N,N-(di-acetoxyethyl)-aniline | reddish yellow |
| 99 | 4-methyl-5-aminosulphonyl-2-amino-1,3-thiazole    3-acetylamino-N,N-dimethyl-aniline | red |
| 100 | 5-nitro-3-amino-benzoisothiazole-(2,1)    3-methylsulphonylamino-N,N-dimethyl-aniline | navy |
| 101 | 5-nitro-3-amino-benzoisothiazole-(2,1)-6-sulphonic acid amide    3-acetylamino-N,N-dimethyl-aniline | red |

EXAMPLE 102

100 Parts of a knitted fabric of polyethylene terephthalate fibres are dyed in a dyebath containing
1 part of the disazo dyestuff 4-aminobenzene-sulphonic acid amide    aniline    phenol in
1000 parts tetrachloroethylene
at 115°C for 30 minutes. After the usual rinsing and drying, there is obtained a reddish yellow dyeing of very good fastness to sublimation, washing and light.

Dyeings of equally valuable fastness properties were also obtained when the above dyestuff was replaced with the same amount of one of the following disazo dyestuffs:

| Example | Dyestuff | Shade |
|---|---|---|
| 103 | 4-amino-benzene-sulphonic acid methylamide    2,5-dimethoxy-aniline    phenol | reddish orange |
| 104 | 3-chloro-4-amino-benzene-sulphonic acid (4-chlorophenyl)-amide    2-chloro-aniline    phenol | orange |
| 105 | 3-amino-toluene    3-ethoxy-aniline    1-hydroxy-benzene-2-sulphonic acid-(2-hydroxyethyl)-amide | orange |
| 106 | 4-chloro-3-amino-benzene-sulphonic acid amide    3-amino-toluene    salicylic acid | reddish yellow |
| 107 | 3-nitro-4-amino-benzene-sulphonic acid amide    3-amino-ethylbenzene    phenol | reddish yellow |
| 108 | 2-amino-benzene-sulphonic acid amide    aniline    salicylic acid amide | reddish yellow |
| 109 | 4-amino-toluene    3-amino-benzene-sulphonic acid amide    phenol | yellow |
| 110 | 2,5-dichloro-aniline    aniline    3-hydroxy-N-(4-aminosulphonylbutyl)-aniline | orange-brown |
| 111 | 4-methylsulphonylamino-aniline    3-amino-toluene    phenol | reddish yellow |
| 112 | 4-(3-methylaminosulphonylpropylamino)-aniline    3-methoxy-aniline    phenol | reddish yellow |
| 113 | 4-(4-methoxyphenylsulphonylamino)-aniline    3-amino-ethylbenzene    phenol | reddish yellow |
| 114 | 4-amino-benzene-sulphonic acid amide    1-aminonaphthalene    phenol | orange |
| 115 | 3-nitro-4-amino-benzene-sulphonic acid amide    2-amino-naphthalene    phenol | orange |
| 116 | aniline    1-amino-naphthalene    1-hydroxy-benzene-2-sulphonic acid amide | orange |
| 117 | 3-amino-benzene-sulphonic acid (2-cyanoethyl)-amide    aniline | reddish yellow |
| 118 | 4-amino-benzene-sulphonic acid amide    2-chloro-aniline    4-tert.butyl-phenol | reddish yellow |
| 119 | 4-amino-benzene-sulphonic acid amide    aniline    4-hydroxy-toluene | reddish yellow |
| 120 | 4-amino-benzene-sulphonic acid amide    3-amino-toluene    4-hydroxy-toluene | reddish yellow |
| 121 | aniline    1-amino-naphthalene-8-sulphonic acid amide    phenol | orange |

EXAMPLE 122

50 Parts of a fabric of polyester fibres are introduced at room temperature into a dyebath prepared from 1 part 1-amino-4-hydroxy-2-(4-aminosulphonylphenyl-thio-anthraquinone
1.5 parts oleic acid ethanolamide
1.5 parts oleyl alcohol eicosaethylene glycol ether
6 parts of water and
500 parts tetrachloroethylene.

The bath is heated to 120°C within 10 minutes and kept at the same temperature for 45 minutes while the liquor is vividly circulating. After separation of the dye liquor, the dyed material is rinsed with fresh solvent at 40°C and, after removal of the rinsing liquor, dried in an air current. A brilliant violet dyeing of excellent fastness to light and sublimation is obtained.

Equally satisfactory violet dyeings are obtained when the 500 parts tetrachloroethylene are replaced with the same amount of 1,1,2-trichloroethane, 1,1,1,2-tetrachloroethane, 1,1,2,2-tetrachloroethane, pentachloroethane, 1,2-dichloropropane, 2-chlorobutane, 1,4-dichlorobutane, perfluoro-n-hexane, 1,2,2-trifluoro-trichloroethane, trifluoro-pentachloropropane, chlorobenzene, fluorobenzene, chlorotoluene or benzotrifluoride.

The dyestuff used in Example 122 had been prepared as follows: 15 parts 1-amino-4-hydroxy-2-phenylthioanthraquinone are dissolved in 76 parts chlorosulphonic acid, and 22.5 parts thionyl chloride are added at 20° – 25°C within 1 hour. The melt is stirred at 20° – 25°C for 3 hours, turned out on to ice, the precipitate is filtered off with suction and washed with ice-water until neutral. The product is subsequently introduced into 250 parts of 25% ammonia and stirred at 20° – 25°C for 5 hours. It is filtered off with suction, washed with water, and after drying there are obtained 18.5 parts 1-amino-4-hydroxy-2-(4-aminosulphonylphenyl-thio)-anthraquinone = 96% of theory.

EXAMPLE 123

100 Parts of fibre yarn of poly-ε-caprolactam are introduced at room temperature into a dyebath containing 1 part of the dyestuff mentioned in Example 122 in 1000 parts tetrachloroethylene.

The bath is heated to 100°C within 20 minutes and kept at the same temperature for 40 minutes while the liquor is vividly circulating. After this period of time, the liquor is separated, the dyeing is briefly rinsed with fresh solvent and dried in an air current after centrifuging. A brilliant violet dyeing of good fastness properties is obtained.

An equally satisfactory dyeing was also obtained on yarns of polyhexamethylene-diamine adipate fibres.

The strength of colour of the dyeing can be increased by ~ 10% by the addition of 1 part oleic acid ethanolamide
1 part oleyl alcohol eicosaethylene glycol ether and
4 parts of water to the dyebath.

EXAMPLE 124

100 Parts polyethylene terephthalate fabric are dyed at 115°C for 30 minutes in a dyebath consisting of 1 part 1-amino-4-hydroxy-2-(4-methylamino-sulphonylphenoxy)-anthraquinone,
3 parts oleic acid ethanolamide
3 parts oleyl alcohol eicosaethylene glycol ether
12 parts of water and
1600 parts tetrachloroethylene.

After rinsing with fresh tetrachloroethylene and drying, there is obtained a strong and brilliant red dyeing of very good fastness to sublimation, washing and light.

When the above dyestuff was replaced with the same amount of one of the dyestuff listed in the following Table, then dyeings of equally satisfactory fastness properties were obtained in the shades stated in the Table:

| Example | Dyestuff | Shade |
|---|---|---|
| 125 | 1-amino-4-hydroxy-2-[4-(2-methoxyethyl-amino)-sulphonyl-phenoxy]-anthraquinone | red |
| 126 | 1-amino-4-hydroxy-2-[4-(2-hydroxyethyl-amino)-sulphonyl-phenoxy]-anthraquinone | red |
| 127 | 1-amino-4-hydroxy-6-chloro-2-(4-amino-sulphonyl-phenoxy)-anthraquinone | red |
| 128 | 1-amino-4-hydroxy-6,7-difluoro-2-(4-thiomorpholino-sulphonyl-phenoxy)-anthraquinone | red |
| 129 | 1-amino-4-hydroxy-2-(4-methysulphonyl-aminophenoxy)-anthraquinone | red |
| 130 | 1-amino-4-hydroxy-2-[2-(4-aminosulphonyl-phenoxy)-ethoxy]-anthraquinone | red |
| 131 | 1-amino-4-hydroxy-2-[2-(4-methylamino-sulphonylphenyl)-ethoxy]-anthraquinone | red |
| 132 | 1-amino-4-hydroxy-2-[4-aminosulphonyl phenylthio)-ethoxy-]anthraquinone | red |
| 133 | 1-amino-4-hydroxy-2-(4-diethylamino-sulphonylamino-phenoxy)-anthraquinone | red |
| 134 | 1-amino-4-hydroxy-2-[4-(3-methoxy-propylamino)-sulphonyl-phenyl-thio]-anthraquinone | violet |
| 135 | 1-amino-4-hydroxy-2-[4-(2-hydroxy-ethylamino)-sulphonyl-phenyl-thio]-anthraquinone | violet |
| 136 | 1-amino-4-hydroxy-2-[4-chloro-2-(di-2-hydroxyethyl)-amino-sulphonyl-phenyl-thio]-anthraquinone | violet |
| 137 | 1-amino-4-hydroxy-2-(4-methylthio-3-amino-sulphonyl-phenyl-thio)-anthraquinone | violet |
| 138 | 1-amino-4-hydroxy-7-chloro-2-[(2-methyl-sulphonylethyl)-amino-sulphonyl-phenyl-thio]-anthraquinone | violet |
| 139 | 1-amino-4-hydroxy-2-(3-aminosulphonyl propylthio)-anthraquinone | bluish red |
| 140 | 1-amino-4-hydroxy-2-(4-methylamino-sulphonyl-benzylthio)-anthraquinone | bluish red |
| 141 | 1-amino-4-hydroxy-2-[2-(4-hexamethylene-imino-sulphonyl-phenyl)-ethylthio]-anthraquinone | bluish red |
| 142 | 1-amino-4-hydroxy-2-[2-(3-methyl-4-aminosulphonyl-phenoxy)-ethyl-thio]-anthraquinone | bluish red |
| 143 | 1-amino-4-hydroxy-2-(2-dimethylamino-sulphonylethylthio)-anthraquinone | bluish red |
| 144 | 1-amino-4-methoxy-2-(4-methylamino-sulphonyl-phenoxy)-anthraquinone | yellow-red |
| 145 | 1-amino-4-methoxy-2-(4-N-methyl-N-phenylamino-sulphonyl-phenyl-thio)-anthraquinone | red |
| 146 | 1-amino-2-(4-morpholinosulphonyl-phenoxy)-anthraquinone | orange |
| 147 | 1-amino-2-(4-aminosulphonyl-phenyl-thio)-anthraquinone | yellow-red |
| 148 | 1,4-dihydroxy-2-[4-(2-cyanoethylamino)-sulphonyl-phenoxy]-anthraquinone | orange |
| 149 | 1,4-dihydroxy-2-(4-aminosulphonyl-phenoxy)-anthraquinone | orange |
| 150 | 1,4-dihydroxy-2-(4-methylamino-sulphonyl-phenyl-thio)-anthraquinone | scarlet |
| 151 | 1,4-diamino-2-[4-(3-cyano-phenyl-amino)-sulphonyl-phenoxy]-anthraquinone | blue-violet |
| 152 | 1,4-diamino-2,3-bis-(4-amino-sulphonyl-phenoxy)-anthraquinone | red-violet |
| 153 | 1,4-diamino-2-(4-amino-sulphonyl-phenyl-thio)-anthraquinone | reddish blue |
| 154 | 1,4-diamino-2-[4-(3-methoxypropylamino)-sulphonyl-phenyl-sulphonyl]-anthraquinone | reddish blue |
| 155 | 1,4-diamino-anthraquinone-2-sulphonic acid (4-ethyl-amino-sulphonyl-phenyl) ester | reddish blue |
| 158 | 1-hydroxy-4-(3-methylamino-sulphonyl-phenyl-amino)-anthraquinone | blue-violet |
| 157 | 1-hydroxy-4-(4-methyl-3-amino-sulphonyl-phenyl-amino)-anthraquinone | blue-violet |
| 158 | 1-hydroxy-4-(4-methylsulphonyl-amino- | reddish |

| Example | Dyestuff | Shade |
|---|---|---|
| | phenyl-amino)-anthraquinone | blue |
| 159 | 1-amino-4-[4-(2-cyanoethyl-2-hydroxyethyl-amino-sulphonyl)-phenyl-amino]-anthraquinone | blue |
| 160 | 1-amino-4-(2,6-diethyl-4-methyl-3-amino-sulphonyl-phenyl-amino)-anthraquinone | reddish blue |
| 161 | 1-amino-2-bromo-4-(4-methoxy-3-amino-sulphonyl-phenylamino)-anthraquinone | reddish blue |
| 162 | 1-amino-2-phenyl-thio-4-(4-methyl-3-amino-sulphonyl-phenylamino)-anthraquinone | blue |
| 163 | 1-amino-2-phenyl-sulphonyl-4-(3-amino-sulphonyl-phenylamino)-anthraquinone | greenish blue |
| 164 | 1-amino-4-(4-amino-sulphonyl-phenyl-thio)-anthraquinone | red |
| 165 | 1-amino-2-(4-amino-sulphonyl-phenoxy)-4-(4-methylphenyl)-sulphonyl-amino)-anthraquinone | pink |
| 166 | 1-amino-2-(4-amino-sulphonyl-phenoxy)-4-methyl-sulphonyl-amino-anthraquinone | pink |
| 167 | 1-amino-anthraquinone-2-sulphonic acid (4-methoxyphenyl-amide) | red |
| 168 | 1-amino-4-hydroxy-anthraquinone-2-sulphonic acid-(3-trifluoromethyl-phenyl-amide) | red |
| 169 | 1,4-diamino-anthraquinone-2-sulphonic acid amide | blue |
| 170 | 1,4-diamino-anthraquinone-2-sulphonic acid (2-methoxy-ethyl)-amide | blue |
| 171 | 1,5-dihydroxy-4,8-diamino-anthraquinone-2-sulphonic acid ethylamide | blue |
| 172 | 1,5-dihydroxy-4,8-diamino-anthraquinone-2,6-disulphonic acid-(3-methoxypropyl)-amide | blue |
| 173 | 1,4-diamino-2-[5-methylaminosulphonyl-benzoxazolyl-(2)]-anthraquinone | blue |
| 174 | 1-amino-4-(4-methylphenyl-amino)-anthraquinone-2-sulphonic acid-(2-hydroxyethyl)-amide | blue |
| 175 | 1-amino-4-cyclohexyl-amino-anthraquinone-2-sulphonic acid amide | blue |
| 176 | 1-(3-aminosulphonyl-propyl-amino)-anthraquinone | red |
| 177 | 1,4-bis-(3-amino-sulphonyl-propyl-amino)-anthraquinone | blue |
| 178 | 1,5-dihydroxy-4,8-diamino-2-(4-hydroxy-3-ethylamino-sulphonyl-phenyl)-anthraquinone | blue |
| 179 | 1,5-dihydroxy-4,8-diamino-3-(4-hydroxy-3-methylamino-sulphonyl-phenyl)-anthraquinone | blue |
| 180 | 1,5-dihydroxy-8-nitro-4-(ethylamino-sulphonyl-phenylamino)-anthraquinone | blue |
| 181 | 1,8-dihydroxy-5-nitro-4-(3-amino-sulphonyl-phenylamino)-anthraquinone | blue |
| 182 | 1,5-dihydroxy-8-amino-4-(3-methylamino-sulphonyl-phenylamino)-anthraquinone | blue |
| 183 | 1,8-dihydroxy-5-amino-4-(3-amino-sulphonyl-phenylamino)-anthraquinone | blue |
| 184 | 1,5-dihydroxy-8-amino-x-chloro-4-(3-amino-sulphonyl-phenylamino)-anthraquinone | blue |
| 185 | 1,5-dihydroxy-8-nitro-x-bromo-4-(3-amino-sulphonyl-phenylamino)-anthraquinone | blue |
| 186 | 1,8-dihydroxy-5-amino-x-bromo-4-(3-amino-sulphonyl-phenylamino)-anthraquinone | blue |
| 187 | 1,8-dihydroxy-5-amino-x-bromo-4-(3-amino-sulphonyl-phenylamino)-anthraquinone | blue |
| 188 | 1,8-dihydroxy-5-methylamino-4-(4-methyl-3-amino-sulphonyl-phenylamino)-anthraquinone | blue |
| 189 | 1,9-isothiazolanthrone-2-sulphonic acid (4-bromo-phenyl)-amide | yellow |
| 190 | 5-(2-aminosulphonyl-ethylamino)-1,9-isothiazoloanthrone | yellow |
| 191 | 1,9-pyrazoloanthrone-2-sulphonic acid-N-(2-hydroxyethyl)-N-phenyl-amide | yellow |
| 192 | 5-(2-amino-sulphonyl-ethylamino)-1,9-pyrazoloanthrone | yellow |
| 193 | 4-(3-amino-sulphonyl-phenylamino)-N-methyl-1,9-anthrapyridone | red |
| 194 | 7-(2-hydroxyethyl)-amino-sulphonyl-3,4-phthaloyl-acridone | red |
| 195 | 7-(3-methoxypropyl)-amino-sulphonyl-2-amino-3,4-phthaloyl-acridone | |
| 196 | 1,8-naphthoylene-benzimidazole-Bz-3- | yellow |
| | sulphonic acid methylamide | |
| 197 | 1,8-naphthoylene-benzimidazole-4-sulphonic acid amide | yellow |
| 198 | 1,8-naphthoylene-benzimidazole-4,5-dicarboxylic acid-(2-methoxy-ethylimide)-Bz-3-sulphonic acid ethylamide | yellow |
| 199 | phthaloylene-(1,8-naphthopyrimidine)-3- or 8-sulphonic acid amide | yellow |
| 200 | 4-(3-amino-sulphonyl-phenyl-amino)-1,9-isothiazolo-anthrone | yellow |
| 201 | 5-(3-amino-sulphonyl-phenyl-amino)-1,9-isothiazolo-anthrone | yellow |
| 202 | 4-(3-methylamino-sulphonyl-phenyl-amino)-1,9-pyrazolo-anthrone | yellow |
| 203 | 5-[3-(2-methoxyethyl-amino-sulphonyl)-phenyl-amino]-1,9-pyrazolo-anthrone | yellow |

EXAMPLE 204

100 Parts polyethylene terephthalate filaments are dyed in a dyebath consisting of 1 part 4-phenylamino-3-nitrobenzene-sulphonic acid amide
3 parts oleic acid ethanolamide
3 parts oleyl alcohol eicosaethylene glycol ether
12 parts of water and
1600 parts tetrachloroethylene at 115°C for 30 minutes while the liquor is vividly circulating, they are centrifuged and rinsed with tetrachloroethylene at 40°C for 5 minutes. A strong greenish yellow dyeing of very good fastness to sublimation, washing and light is obtained.

An equally satisfactory dyeing is obtained when the tetrachloroethylene is replaced with the same amount of 1,1,2-trichloroethane.

When 1 part 4-phenylamino-3-nitrobenzene-sulphonamide is replaced with a mixture of 0.5 parts 4-phenylamino-3-nitrobenzene-sulphonic acid amide and 0.5 parts 4-(4-methoxyphenylamino)-3-nitrobenzene-sulphonamide, then a somewhat more reddish strong dyeing is obtained.

Similar dyeings are also obtained when the polyethylene terephthalate filaments are replaced with fibres of anion-modified polyethylene terephthalate (Dacron 64) or anion-modified polyhexamethylene-diamine adipate (Nylon T 844).

The dyestuff used in Example 204 had been prepared as follows: 900 parts of n-butanol saturated with ammonia are mixed with 550 parts of 79% 4-chloro-3-nitrobenzene sulphochloride and the mixture is stirred at 55° – 60°C for 1 hour. 200 Parts aniline were added and the mixture was heated to boiling temperature while slowly introducing ammonia, until the dyestuff formation was completed. After cooling, the crystallised product was filtered off with suction, washed with methanol and water and after drying there were obtained 460 parts 4-phenylamino-3-nitrobenzene-sulphonic acid amide = 92% of theory; m.p. 155°C.

EXAMPLE 205

100 Parts of polycarbonate filaments are dyed in a dyebath consisting of 1 part 4-(4-methoxy-phenylamino)-3-nitrobenzene-sulphonic acid amide
2.5 parts oleic acid ethanolamide
2.5 parts oleyl alcohol eicosaethylene glycol ether
10 parts of water and
1000 parts tetrachloroethylene as described in Example 204. A yellow dyeing of very good fastness to sublimation, washing and light is obtained.

When the dyestuffs given in Examples 204 and 205 were replaced with the same amount of one of the dyestuffs listed in the following Table, then dyeings of equally satisfactory fastness properties were obtained in the shades stated in the Table:

| Example | Dyestuff | Shade |
| --- | --- | --- |
| 206 | 4-(4-ethoxy-phenylamino)-3-nitro-benzene-sulphonic acid methylamide | reddish yellow |
| 207 | 4-(2-methoxy-phenylamino)-3-nitro-benzene-sulphonic acid dimethylamide | reddish yellow |
| 208 | 4-phenylamino-3-nitro-benzene-sulphonic acid-(di-2-hydroxyethyl)-amide | yellow |
| 209 | 4-(4-phenyl-phenylamino)-3-nitro-benzene-sulphonic acid amide | yellow |
| 210 | 4-(4-phenoxy-phenylamino)-3-nitro-benzene-sulphonic acid | reddish yellow |
| 211 | 4-(4-azobenzeneamino)-3-nitro-benzene-sulphonic acid-(di-2-hydroxyethyl-amide | reddish yellow |
| 212 | 4-[4-(2-hydroxyethoxy)-phenylamino]-3-nitro-benzene-sulphonic acid phenylamide | reddish yellow |
| 213 | 4-(4-benzyloxy-phenylamino)-3-nitro-benzene-sulphonic acid morpholide | reddish yellow |
| 214 | 4-(3-methoxy-phenylamino)-3-nitro-benzene-sulphonic acid-(4-aminosulphonyl-phenyl)-amide | reddish yellow |
| 215 | 4-(4-methoxycarbonyl-phenylamino)-3-nitro-benzene-sulphonic acid-(2-hydroxyethyl)-amide | greenish yellow |
| 216 | 4-(2,4-dimethoxy-phenylamino)-3-nitro-benzene-sulphonic acid amide | reddish yellow |
| 217 | 4-(4-carboxy-phenylamino)-3-nitro-benzene-sulphonic acid ethylamide | greenish |
| 218 | 4-[4-(2-hydroxyethyl-aminosulphonyl)-phenylamino]-benzene-sulphonic acid-(2-hydroxyethyl)-amide | greenish yellow |
| 219 | 4-(3-fluoro-phenylamino)-3-nitro-benzene-sulphonic acid-(2-methoxyethyl-amide | greenish yellow |
| 220 | 4-(3-trifluoromethyl-phenylamino)-3-nitro-benzene-sulphonic acid-(2-cyano-ethyl)-amide | greenish yellow |
| 221 | 4-(3,4-dichloro-phenylamino)-3-nitro-benzene-sulphonic acid-(3-methoxypropyl)-amide | greenish yellow |
| 222 | 4-(3-cyano-phenylamino)-3-nitro-benzene-sulphonic acid-(4-methylamino-carbonyl-phenyl)-amide | yellow |
| 223 | 4-(2-nitro-phenylamino)-3-nitro-benzene-sulphonic acid piperidide | greenish yellow |
| 224 | 4-(4-methyl-phenylamino)-3-nitro-benzene-sulphonic acid amide | yellow |
| 225 | 4-(4-ethyl-phenylamino)-3-nitro-benzene-sulphonic acid-[4-(2-hydroxy-ethoxy)-phenyl]-amide | yellow |
| 226 | 4-(4-aminosulphonyl-phenylamino)-3-nitro-benzene-sulphonic acid-(di-2-hydroxy-ethyl)-amide | greenish yellow |
| 227 | 4-(4-aminosulphonyl-phenylamino)-3-nitro-benzene-sulphonic acid-(3-diethyl-amino-sulphonyl-phenyl)-amide | greenish yellow |
| 228 | 4-(4-acetylamino-phenylamino)-3-nitro-benzene-sulphonic acid ethylamide | yellow |
| 229 | 4-(4-methylsulphonylamino-phenylamino)-3-nitro-benzene-sulphonic acid phenylamide | yellow |
| 230 | 4-(4-methylsulphonylamino-phenylamino)-3-nitro-benzene-sulphonic acid-(2-hydroxy-ethyl)-amide | yellow |
| 231 | 4-phenylamino-4-nitro-benzene-sulphonic acid-(4-aminosulphonyl-phenyl)-amide | greenish yellow |
| 232 | 4-(4-methoxy-phenylamino)-3-nitro-benzene-sulphonic acid-(3-methylamino-sulphonyl-phenyl)-amide | reddish yellow |
| 233 | 4-(4-ethoxy-phenylamino)-3-nitro-benzene-sulphonic acid-[3-(2-cyanoethyl-aminosulphonyl)-phenyl]-amide | reddish yellow |
| 234 | 4-(4-methyl-phenylamino)-3-nitro-benzene-sulphonic acid-(4-aminosulphonyl-phenyl)-amide | yellow |
| 235 | 4-(3-trifluoromethyl-phenylamino)-3-nitro-benzene-sulphonic acid-[3-(2-cyano-ethyl-2-hydroxyethyl-aminosulphonyl)-phenyl]-amide | greenish yellow |
| 236 | 4-phenylamino-3-nitro-benzene-sulphonic acid-[4-(2-aminosulphonylethoxy)-phenyl]-amide | greenish yellow |
| 237 | 4-[4-(3-aminosulphonyl-propoxy)-phenyl-amino]-3-nitro-benzene-sulphonic acid-(3-chloro-phenyl)-amide | reddish yellow |
| 238 | 4-phenylamino-3-nitro-benzene-sulphonic acid-(4-aminosulphonyl-phenyl) ester | yellow |
| 239 | 4-(4-methoxy-phenylamino)-3-nitrobenzene-sulphonic acid-(3-methylamino-sulphonyl-phenyl) ester | reddish yellow |
| 240 | 4-(3-ethoxy-phenylamino)-3-nitrobenzene-sulphonic acid-[4-(di-2-hydroxy-ethyl-sulphonylamino)-phenyl] ester | reddish yellow |
| 241 | 4-(4-aminocarbonyl-phenylamino)-3-nitrobenzene-sulphonic acid-(4-ethylamino-sulphonyl-phenyl) ester | greenish yellow |
| 242 | 4-(3-acetylamino-phenylamino)-3-nitro-benzene-sulphonic acid-(4-aminosulphonyl-phenyl) ester | yellow |
| 243 | 4-phenylamino-3-nitro-benzoic acid (4-aminosulphonyl-phenyl) amide | yellow |
| 244 | 4-(4-ethoxyphenylamino)-3-nitro-benzoic acid-[3-(2-hydroxyethylamino-sulphonyl)-phenyl]-amide | reddish yellow |
| 245 | 4-(2,4-dimethoxy-phenylamino)-3-nitro-benzoic acid-(4-methylaminosulphonyl-phenyl)-amide | reddish yellow |
| 246 | 4-(4-methyl-phenylamino)-3-nitro-benzoic acid-(3-methylaminosulphonyl-phenyl)-amide | yellow |
| 247 | 4-(4-nitro-phenylamino)-3-nitro-benzoic acid-(3-pyrrolidinosulphonyl-phenyl)-amide | yellow |
| 248 | 4-(3-bromo-phenylamino)-3-nitro-benzoic acid-(4-hydroxy-3-n-propyl-amino-sulphonyl-phenyl)-amide | yellow |
| 249 | 4-(4-acetylamino-phenylamino)-3-nitro-benzoic acid-(4-thiomorpholinosulphonyl-phenyl)-amide | yellow |
| 250 | 4-(4-methylsulphonylamino-phenylamino)-3-nitro-benzoic acid-(3-dimethylamino-sulphonyl-phenyl)-amide | yellow |
| 251 | 4-phenylamino-3-nitro-benzoic acid-(4-aminosulphonyl-phenyl) ester | yellow |
| 252 | 4-(4-methoxy-phenylamino)-3-nitro-benzoic acid-(3-methylaminosulphonyl-phenyl) ester | yellow |
| 253 | 4-(3-methylsulphonylamino-phenylamino)-3-nitro-benzoic acid-[4-(3-hydroxypropyl-aminosulphonyl)-phenyl] ester | yellow |
| 254 | 4-(4-methylsulphonyl-phenylamino)-3-nitro-benzene sulphonic acid-4-(amino-sulphonyl-phenyl)-amide | greenish yellow |
| 255 | 4-(4-methylsulphonyl-phenylamino)-3-nitro-benzene sulphonic acid-(2-hydrozyethyl)-amide | greenish yellow |
| 256 | 4-(3-hydroxymethyl-phenylamino)-3-nitro-benzene-sulphonic acid-(4-methyl-amino-sulphonyl-phenyl)-amide | yellow |
| 257 | 4-(3-hydroxyphenyl-phenylamino)-3-nitro-benzene-sulphonic acid-morpholide | yellow |
| 258 | 4-(4-hydroxyethyl-phenylamino)-3-nitro-benzene-sulphonic acid-(3-aminosulphonyl-phenyl)-amide | yellow |
| 259 | 4-(4-hydroxyethyl-phenylamino)-3-nitro-benzene-sulphonic acid amide | yellow |

EXAMPLE 260

100 Parts of yarn of polyethylene terephthalate fibres are dyed in a dyebath consisting of 1 part of the quinophthalone dyestuff of the formula 2.5 parts oleic acid ethanolamide
2.5 parts oleyl alcohol
10 parts of water and
1600 parts tetrachloroethylene as described in Example 204. A clear yellow dyeing is obtained, which is characterised by good fastness to sublimation, washing and light.

An equally satisfactory dyeing is obtained when the above quinophthalone-sulphonamide dyestuff is replaced with a bromination product which contains about 1 bromine atom per molecule and can be obtained in known manner by bromination in nitrobenzene or glacial acetic acid.

Clear yellow dyeings are also obtained when the dyestuff mentioned in Example 260 is replaced with equal amounts of the quinophthalene-sulphonic acid amides listed in the following Table:

| Example | $R_1$ | $R_2$ | $R_3$ | $N{<}^B_{B_1}$ |
|---|---|---|---|---|
| 261 | H | H | H | NH—CH₃ |
| 262 | H | H | H | N(CH₃)₂ |
| 263 | H | H | H | NH—C₂H₅ |
| 264 | H | H | H | NH—CH₂—CH₂—OH |
| 265 | H | H | H | N(CH₂—CH₂—OH)₂ |
| 266 | H | H | H | NH—CH₂—CH₂—CN |
| 267 | Cl | H | H | (morpholino) |
| 268 | Br | H | H | NH₂ |
| 269 | Cl | Cl | H | NH—CH₃ |
| 270 | NO₂ | H | H | NH₂ |
| 271 | CH₃O | H | H | NH—CH₂—CH₂—OH |
| 272 | CH₃.CO.NH | H | H | N(CH₃)₂ |
| 273 | H | H | CH₃ | NH₂ |
| 274 | H | H | CH₃O | NH₂ |

Greenish yellow dyeings are obtained when the quinophthalone-sulphonamide dyestuff mentioned in Example 260 is replaced with equal parts of one of the methine dyestuffs of the formulae

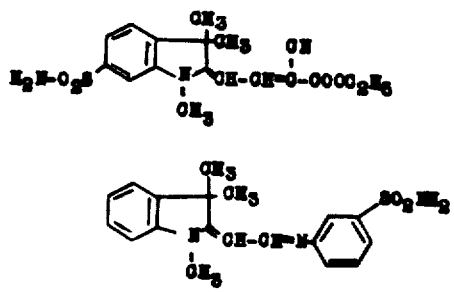

or with a styryl dyestuff of the formula

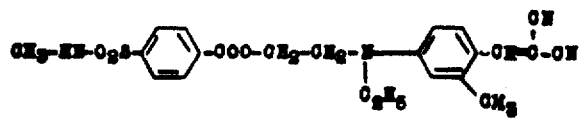

EXAMPLE 275

100 Parts of a fabric of textured polyethylene terephthalate fibres are introduced at room temperature, without previous cleaning, into a dyebath prepared from 1 part 1-amino-4-hydroxy-2-[4-(4'-hydroxyanilinosulphonyl)-phenoxy]-anthraquinone and
1000 parts tetrachloroethylene.

The bath is heated to 115°C within 10 minutes and kept at the same temperature for 30 minutes, while the liquor is vividly circulating. The liquor is then separated and the dyed material is rinsed with fresh solvent at about 40°C for 5 minutes. After separating of the rinsing liquor, the dyed material is centrifuged and dried in an air current.

There is obtained a strong red dyeing of excellent fastness to washing, light, rubbing and sublimation.

An equivalent red dyeing was obtained in the same way on a knitted fabric of poly-ε-caprolactame.

EXAMPLE 276

50 Parts of a fabric of polyester fibres are introduced at room temperature into a dyebath prepared from 1 part 1-amino-4-hydroxy-2-[4-(4'-hydroxyanilinosulphonyl)-phenoxy]-anthraquinone and
1.5 parts oleic acid ethanolamide
1.5 parts oleyl alcohol eicosaethylene glycol ether
6 parts of water and
500 parts tetrachloroethylene.

The bath is heated to 120°C within 10 minutes and kept at the same temperature for 45 minutes while the liquor is vividly circulating. After separation of the dye liquor, the dyed material is rinsed with fresh solvent at 40°C and, after removal of the rinsing liquor, dried in an air current. A brillant red dyeing of excellent fastness to washing, rubbing, light and sublimation is obtained.

EXAMPLE 277

100 parts of fibre yarn of poly-ε-caprolactame are introduced at room temperature into a dyebath containing 1 part 1,4-diamino-2-[4-(4'-hydroxyanilinosulphonyl)-phenylthio]-anthraquinone in
1000 parts tetrachloroethylene.

The bath is heated to 100°C within 20 minutes and kept at the same temperature for 40 minutes while the liquor is vividly circulating. After this period of time, the liquor is separated, the dyeing is briefly rinsed with fresh solvent and dried in an air current after centrifuging. A brillant reddish blue dyeing of excellent fastness to washing, light, rubbing and sublimation is obtained.

An equivalent dyeing was obtained in the same manner on a yarn of poly-hexamethylene diamine adipate fibres.

EXAMPLE 278

100 Parts of a fabric of textured polyethylene terephthalate fibres are introduced at room temperature, without previous cleaning, into a dyebath prepared from 1 part 4-(4-hydroxyphenylamino)-3-nitro-benzenesulphonic acid-4-(hydroxyphenyl)-amide and
1000 parts tetrachloroethylene.

The bath is heated to 115°C within 10 minutes and kept at the same temperature for 30 minutes, while the liquor is vividly circulating. The liquor is then separated and the dyed material is rinsed with fresh solvent at about 40°C for 5 minutes. After separating of the rinsing liquor, the dyed material is centrifuged and dried in an air current. A strong yellow dyeing of excellent fastness to washing, rubbing, light and sublimation is obtained.

An equivalent yellow dyeing was obtained in the same manner on a fabric of poly-ε-caprolactame fibres.

EXAMPLE 279

50 Parts of a fabric of polyester fibres are introduced at room temperature into a dyebath prepared from
1 part 4-(4-hydroxyphenylamino)-3-nitro-benzene-sulphonic acid-(4-hydroxyphenyl)-amide
1.5 parts oleic acid ethanolamide
1.5 parts oleyl alcohol eicosaethylene glycol ether
6 parts of water and
500 parts tetrachloroethylene.

The bath is heated at 120°C within 10 minutes and kept at the same temperature for 45 minutes while the liquor is vividly circulating. After separation of the dye liquor, the dyed material is rinsed with fresh solvent at 40°C and, after removal of the rinsing liquor, dried in an air current. A brillant yellow dyeing of excellent fastness washing, rubbing, light and sublimation is obtained.

I claim:

1. Process for dyeing synthetic fiber material by exhaustion comprising introducing synthetic fiber material into a dyebath which is a dispersion consisting essentially of
   A. organic solvent;
   B. a monoazo or disazo dyestuff containing 1 to 3 sulfonamide groups and largely insoluble in said dyebath; and
   C. up to 1% by weight of said organic solvent of water; said organic solvent consisting of water immiscible aliphatic halogenated hydrocarbon; and
dyeing at a temperature of 60° to 170°C for 10–60 minutes until the dyebath is exhausted;
said monoazo or disazo dyestuff being free of reactive groups, acid groups and carboxamide groups.

2. Dyeing process of claim 1 in which said monoazo or disazo dyestuff is a monazo dyestuff having the formula

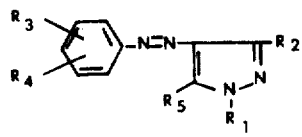

in which
   $R_1$ stands for hydrogen, a sulphonamide group, a $C_1$–$C_4$ alkyl radical which may be substituted by a cyano, carboxy or sulphonamide group, or for an aryl radical which may be substituted by chlorine or by a carboxy or sulphonamide group;
   $R_2$ means a $C_1$–$C_4$-alkyl, $C_1$–$C_4$-alkoxy, $C_1$–$C_4$-carbalkoxy, carboxy or carboxamide group;
   $R_3$ means a $C_1$–$C_4$-alkyl, $C_1$–$C_4$-alkoxy, nitro or sulphonamide group;
   $R_4$ means hydrogen, chlorine, a $C_1$–$C_4$-alkoxy, cyano, nitro or sulphonamide group;
   $R_5$ means a hydroxy or amino group,
with the proviso that at least one of the radicals $R_1$, $R_2$ or $R_3$ is a sulphonamide group or a radical containing a sulphonamide group.

3. Dyeing process of claim 1 in which said monoazo or disazo dyestuff is a monoazo dyestuff having the formula

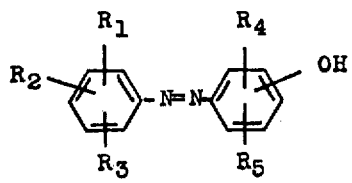

in which
   $R_1$, $R_2$ and $R_3$, independently of one another, stand for hydrogen, halogen, a $C_1$–$C_4$-alkoxy, —O—C$_1$–$C_4$-alkylene-sulphonamide, carboxyl, nitro, acylamino, alkyl- or arylsulphonamido or sulphonamide group;
   $R_4$ means a $C_1$–$C_4$-alkyl, cycloalkyl or sulphonamide group;
   $R_5$ means hydrogen, a carboxy, carboxamide or $C_1$–$C_4$-alkyl group,
with the proviso that at least one of the radicals $R_1$, $R_2$, $R_3$ or $R_4$ is a sulphonamide group or a radical containing a sulphonamide group.

4. Dyeing process of claim 1 in which said dyestuff has the formula

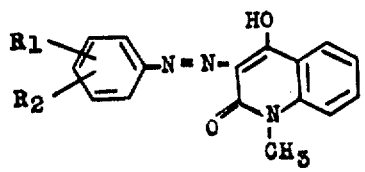

in which
   $R_1$ means a sulphonamide group and
   $R_2$ means hydrogen, chlorine, a nitro or trifluoromethyl group.

5. Dyeing process of claim 1 in which said dyestuff has the formula

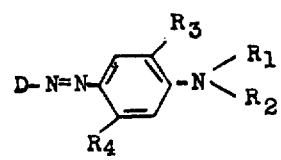

in which
   $R_1$ means hydrogen and
   $R_2$ means a pyrrolidino-carbonyl-ethyl, succinimidoylethyl, 2-cyanoethyl or methylsulphonyl, phenyl or 2-nitrophenyl group, or
   $R_1$ and $R_2$, independently of one another, mean a $C_1$–$C_4$-alkyl group, a 2-hydroxy, 2-$C_1$–$C_4$-alkoxy, 2-cyano, 2-$C_1$–$C_4$-acyloxy, 2-carboxy, 2-$C_1$–$C_4$-alkoxycarbonyl, 2-alkoxy-carbonyloxy, 2-carboxamido, 2-aminosulphonylamino, $C_1$–$C_4$-alkylsulphonylamino-ethyl group or a benzyl group;

$R_3$ stands for hydrogen, a $C_1$–$C_4$-alkoxy or aryloxy group;

$R_4$ stands for hydrogen, a $C_1$–$C_4$-alkyl, $C_1$–$C_4$-acylamino, $C_1$–$C_4$-alkylsulphonylamino, arylsulphonylamino, aminosulphonylamino, aminosulphonyl-alkylene-amino or amino-sulphonylaminoalkylene-amino group;

D means the radical of a carbocyclic diazo component which may be substituted by one or more halogen atoms, cyano, nitro, $C_1$–$C_4$-alkoxy, aminosulphonyl, aminosulphonylamino, $C_1$–$C_4$-alkylsulphonylamino, arylsulphonylamino or sulphonamide groups, or stands for the radical of a heterocyclic diazo component, with the proviso that at least one of the radicals $R_1$, $R_2$, $R_4$ or D is a sulphonamide group or a radical containing a sulphonamide group.

6. Dyeing process of claim 1 in which said dyestuff has the formula

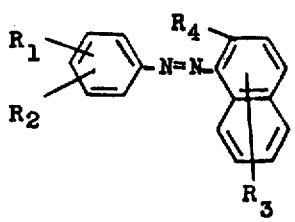

in which
$R_1$ means a nitro, sulphonamide, $C_1$–$C_4$-alkylsulphonamino or arylazo group;
$R_2$ means hydrogen or chlorine;
$R_3$ means hydrogen or a sulphonamide group; and
$R_4$ means a hydroxy or amino group,
with the proviso that at least one of the radicals $R_1$ and $R_3$ is a sulphonamide group or a radical containing a sulphonamide group.

7. Dyeing process of claim 1 in which said dyestuff has the formula

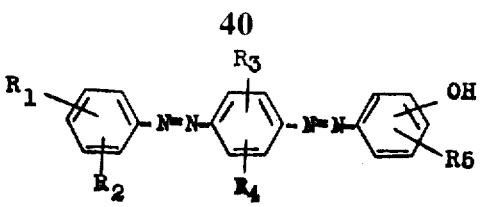

in which
$R_1$ and $R_2$, independently of one another, stand for hydrogen, chlorine, a $C_1$–$C_4$-alkyl, nitro or sulphonamide group;
$R_3$ and $R_4$, independently of one another, stand for hydrogen, chlorine, a $C_1$–$C_4$-alkyl, $C_1$–$C_4$-alkoxy or sulphonamide group, or for a grouping —CH=CH—CH=CH— required for the formation of a naphthalene ring;
$R_5$ stands for hydrogen, a $C_1$–$C_4$-alkyl, cycloalkyl, carboxyl, carboxamide, sulphonamide or aminosulphonylalkyleneamine group,
with the proviso that at least one of the radicals $R_1$, $R_2$, $R_3$, $R_4$ and $R_5$ is a sulphonamide group or a radical containing a sulphonamide group.

8. Dyeing process of claim 1 in which said dyestuff is the coupled product of diazotized 4-aminobenzenesulphonic acid and 3-methyl-pyrazolone(5).

9. The process of claim 1 in which said synethetic fiber material is polyester, polyamide, cellulose, triacetate, cellulose 2½ acetate, polyacrylonitrile, or polyurethane.

10. The process of claim 1 in which said synthetic fiber material is polyester.

11. The process of claim 1 in which said synthetic fiber material is polyamide.

12. The process of claim 1 in which said dyebath contains 0.05 to 2% by weight of non-ionic dyeing auxiliary based on the weight of said aliphatic halogenated hydrocarbon.

* * * * *